July 25, 1961 A. M. SKELLETT 2,994,013

TRANSISTOR CIRCUIT FOR INTERMITTENTLY ENERGIZING A LOAD

Filed Feb. 21, 1958 3 Sheets-Sheet 1

INVENTOR
ALBERT M. SKELLETT
BY
Eyre, Mann & Lucas
ATTORNEYS

July 25, 1961 A. M. SKELLETT 2,994,013

TRANSISTOR CIRCUIT FOR INTERMITTENTLY ENERGIZING A LOAD

Filed Feb. 21, 1958 3 Sheets-Sheet 2

INVENTOR
ALBERT M. SKELLETT
BY
Eyre, Mann & Lucas
ATTORNEYS

July 25, 1961 A. M. SKELLETT 2,994,013

TRANSISTOR CIRCUIT FOR INTERMITTENTLY ENERGIZING A LOAD

Filed Feb. 21, 1958 3 Sheets-Sheet 3

INVENTOR
ALBERT M. SKELLETT
BY
Eyre, Mann & Lucas
ATTORNEYS

United States Patent Office 2,994,013

Patented July 25, 1961

2,994,013

TRANSISTOR CIRCUIT FOR INTERMITTENTLY ENERGIZING A LOAD

Albert M. Skellett, Madison, N.J., assignor to Tung-Sol Electric Inc., a corporation of Delaware Filed Feb. 21, 1958, Ser. No. 716,593
10 Claims. (Cl. 315—241)

The present invention relates to flashers for signal lights or the like and comprises a novel device of this character in which the flashing rate is independent of the load and in which operation is independent of contacts. The new flasher is particularly suited for use in aircraft and can be so constructed as to maintain a constant flashing rate throughout a wide range of temperatures, for example from −55° C. to +65° C.

The new flasher comprises a multivibrator transistor circuit coupled to power transistors, conduction through which control the lamps or other load to be intermittently energized. A feature of the invention is the coupling means between the rate setting transistors of the multivibrator circuit and the power transistors. This coupling means comprises a connection between the emitter of a rate setting transistor and the base of a power transistor, the lamp or load to be flashed being in the collector circuit of that power transistor or in the collector circuit of a transistor of still greater power, conduction through which is controlled by the transistor of lesser power. With this coupling, when one or the other of the rate setting transistors is not conducting, the base current of the associated power transistor and that of any other transistor controlled thereby is cut off.

Another feature of the preferred embodiment of the invention is the incorporation in the rate setting portion of the circuit of temperature compensating means to insure constant rate of flashing throughout the wide temperature range. Still a further feature of the invention is the provision of circuit means permitting operation at the same flashing rate irrespective of whether the source of energy is an A.C. or D.C. source.

Figure 1:
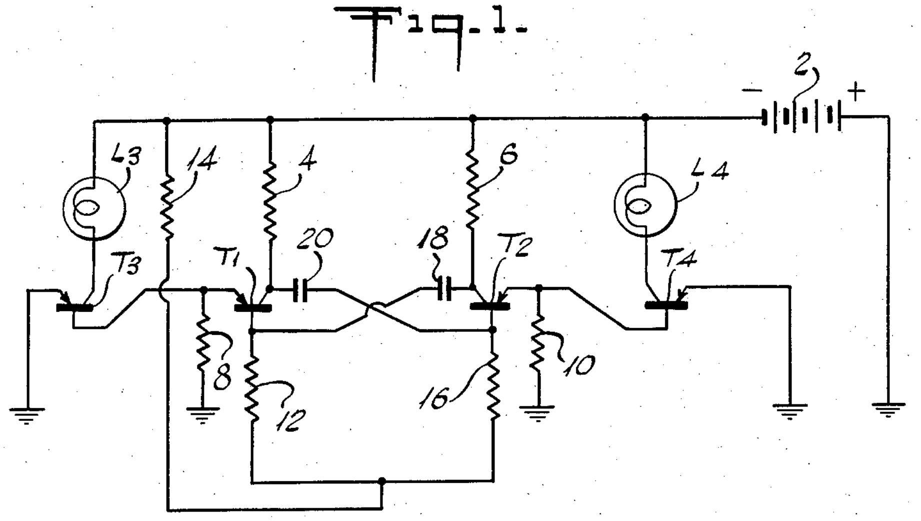
Figure 2:
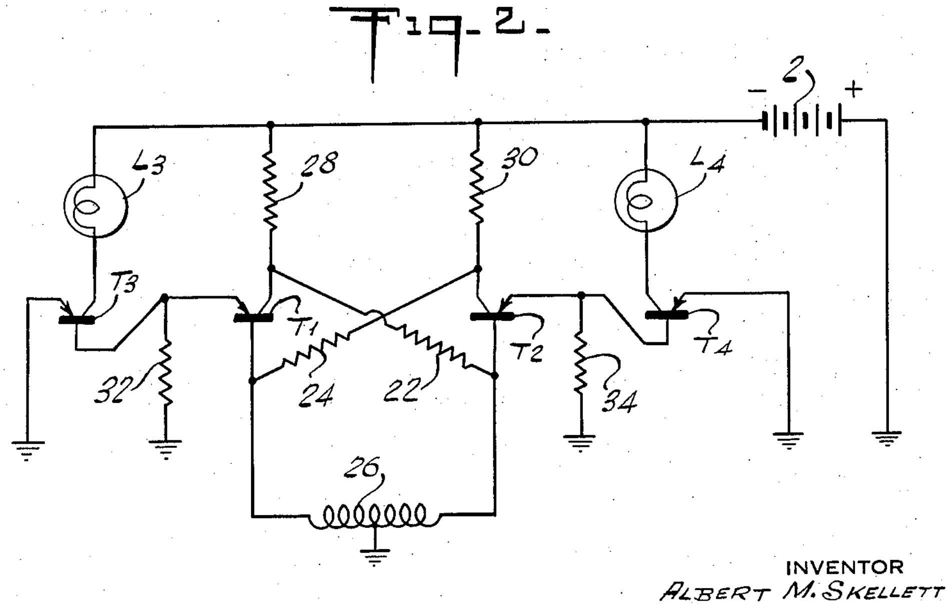
Figure 3:
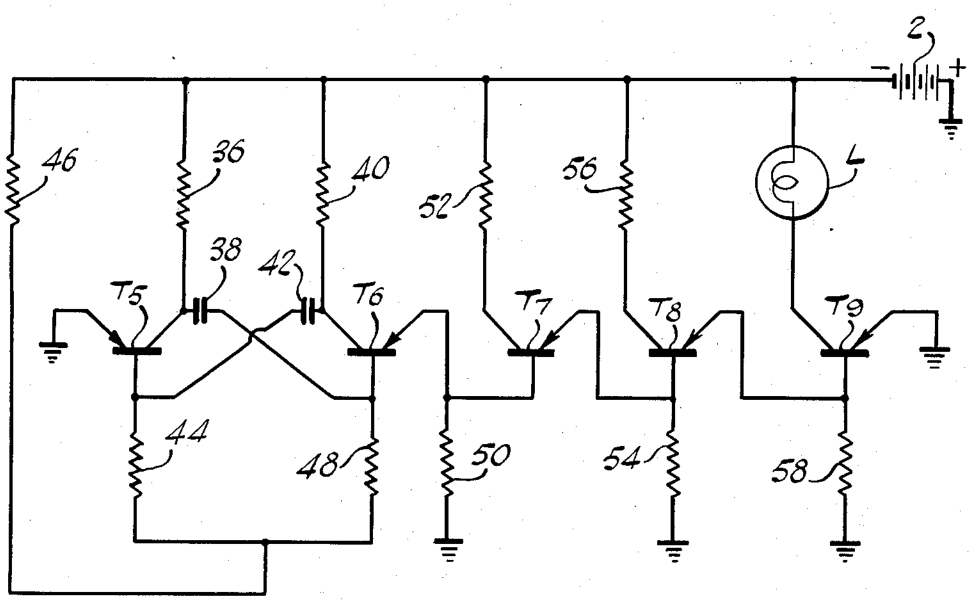
Figure 4:
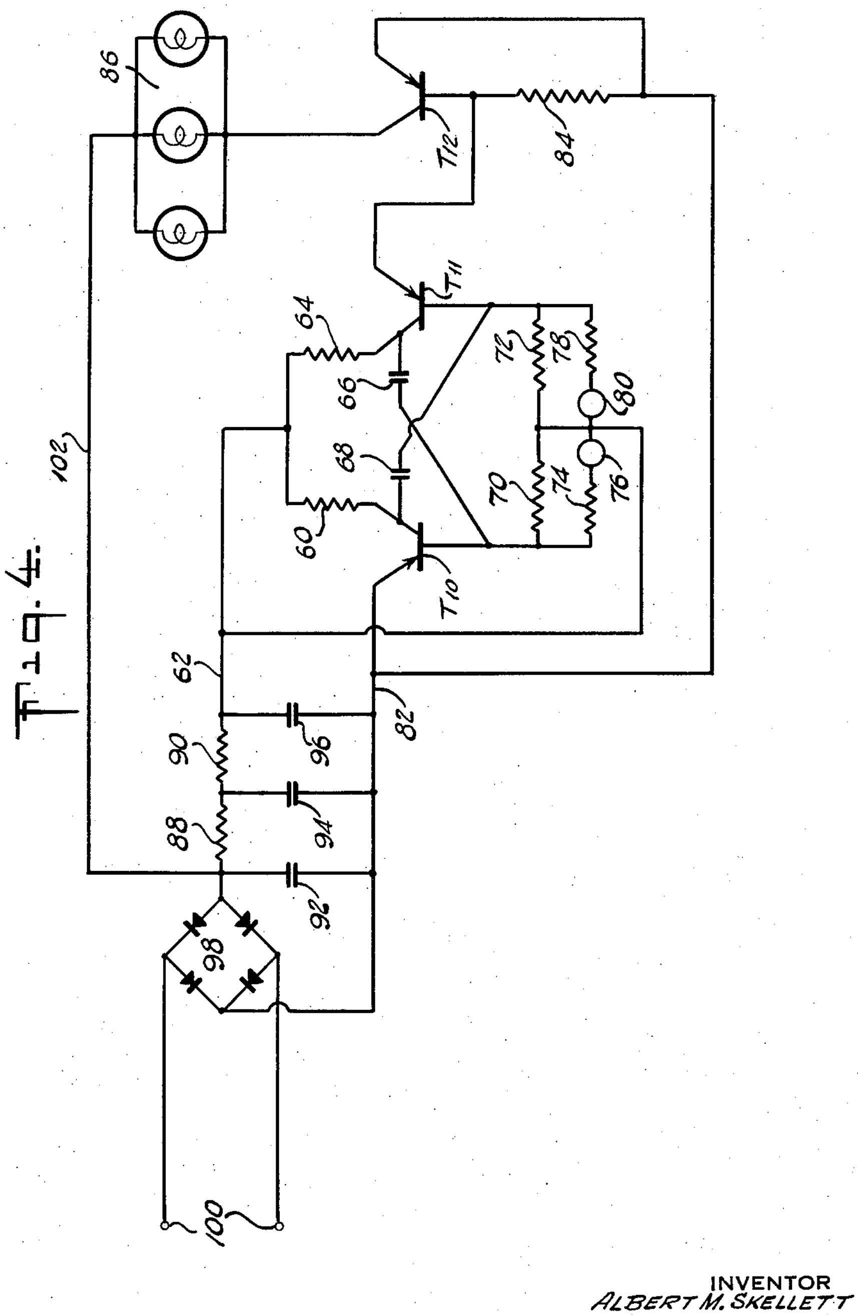

For a better understanding of the invention and of circuits embodying the same reference may be had to the accompanying drawings of which FIG. 1 is a diagrammatic circuit drawing of a flasher system embodying the invention;

FIGS. 2 and 3 are similar circuit drawings of a flasher system particularly suited for use through a wide temperature range; and FIG. 4 is a similar circuit drawing of a temperature compensated flasher circuit embodying the invention and arranged for operation on either A.C. or D.C.

In FIG. 1 transistors $T_1$ and $T_2$ are rate setting transistors and transistors $T_3$ and $T_4$ are power transistors, the conduction through which is controlled by a multivibrator circuit. A source of voltage is indicated as a battery 2 which, for the case of p-n-p type transistors, has its positive terminal grounded and its negative terminal connected through a resistor 4 to the collector terminal of transistor $T_1$ and through a resistor 6 to the collector terminal of transistor $T_2$. The negative terminal of the battery 2 is also connected through a lamp $L_3$ to be flashed to the collector terminal of power transistor $T_3$ and through a lamp $L_4$ to be flashed to the collector terminal of power transistor $T_4$. The emitter terminals of transistors $T_3$ and $T_4$ are grounded and the base terminal of transistor $T_3$ is connected to the emitter terminal of transistor $T_1$. Similarly the base terminal of transistor $T_4$ is connected to the emitter terminal of transistor $T_2$. A resistor 8, connected between ground and the emitter terminal of transistor $T_1$ serves to maintain the base of transistor $T_3$ negative with respect to its emitter. Similarly a resistor 10 connected between ground and the emitter terminal of transistor $T_2$ serves to maintain the base of transistor $T_4$ negative with respect to its emitter. A resistor 12 is connected at one end to the base terminal of transistor $T_1$ and at its other end, through a resistor 14, to the negative terminal of the battery 2. Similarly a resistor 16 is connected at one end to the base of transistor $T_2$ and at the other end to resistor 14. The base of transistor $T_1$ is coupled to the collector of transistor $T_2$ through a capacitor 18 and the base of transistor $T_2$ is connected to the collector of transistor $T_1$ through a capacitor 20.

Resistors 12 and 16 are preferably equal as are resistors 4 and 6 and resistors 8 and 10. Capacitors 18 and 20 may be relatively large, for example 700 microfarads each, and therefore may be electrolytic condensers. Resistor 14 is relatively large and serves as a dropping resistor to place base voltage and current of transistors $T_1$ and $T_2$ at their proper values. Resistors 8 and 10 are of low ohmage, for example 25 ohms each, whereas resistors 4 and 6 are larger, about 75 ohms each, resistors 12 and 16 being still larger, say about 100 ohms each. The transistors $T_1$ and $T_2$ are medium power transistors.

The operation of the above described circuit will now be described. In the unstable condition of the circuit both transistors $T_1$ and $T_2$ are conducting but not saturated, and a potential difference exists across each of the capacitors 18 and 20. If now the collector current of one of the rate setting transistors, for example that of $T_1$, should increase for any reason, the potential at the collector terminal of that transistor will become less negative due to the larger current through resistor 4. Accordingly the potential at the base of transistor $T_2$, due to the coupling through capacitor 20, will also become less negative. Consequently the emitter current of transistor $T_2$ will decrease causing a decrease in the collector current of that transistor. Accordingly the potential at the collector of transistor $T_2$ will become more negative due to the smaller potential drop across resistor 6 and that change in potential will be reflected through capacitor 18 to the base of transistor $T_1$. This increase in negative potential at the base of transistor $T_1$ will cause increase in emitter current of transistor $T_1$ and increase in current through the power transistor $T_3$ and through the lamp $L_3$. The continued decrease in current through transistor $T_2$ and accordingly through power transistor $T_4$ and the lamp $L_4$ and increase in current through transistor $T_1$ and through power transistor $T_3$ and lamp $L_3$ will continue until transistors $T_2$ and $T_4$ are blocked and transistors $T_1$ and $T_3$ are carrying maximum current with lamp $L_3$ illuminated and lamp $L_4$ extinguished. When transistor $T_2$ is thus blocked and no further increase of current through transistor $T_1$ is possible, capacitor 20 discharges through resistors 16 and 14 thus making the potential at the base of transistor $T_2$ more negative and causing transistor $T_2$ to start to conduct. The resulting increase in current through resistor 6 and its reflection through capacitor 18 as a change in potential at the base of transistor $T_1$ starts the reverse cycle in operation resulting finally in lamp $L_3$ being extinguished and lamp $L_4$ being lighted. The rate of flashing of the lamps $L_3$ and $L_4$ is determined primarily by the capacity of the capacitors 18 and 20 and by the values of the resistors 12 and 16. With the above suggested values the flashing rate of the particular circuit of FIG. 1 is about one per second. The values of resistors 8 and 10 are not critical so far as the rate of flashing is concerned.

Although two lamps are indicated as being flashed by the circuit of FIG. 1 the circuit, with no change in flashing rate, could serve to flash but a single lamp if desired. In such case one of the power transistors and its lamp load would be omitted.

In FIG. 2 a flasher generally similar to that of FIG. 1 is illustrated. The circuit of FIG. 2 employs an inductance for providing stored energy to initiate reversal of the cycle rather than capacitors as in the circuit of FIG. 1. In FIG. 2 the power transistors $T_3$ and $T_4$ are coupled to the rate setting transistors $T_1$ and $T_2$ as in the circuit of FIG. 1. The collector terminal of transistor $T_1$ is connected to the base terminal of transistor $T_2$ through a resistor 22 and the collector terminal of transistor $T_2$ is connected to the base terminal of transistor $T_1$ through a resistor 24. The base terminals of transistors $T_1$ and $T_2$ are connected together through an inductor 26, the mid point of which is grounded. As in the circuit of FIG. 1 the collector terminals of transistors $T_1$ and $T_2$ are connected to the negative terminal of battery 2 through respective dropping resistors 28 and 30, the emitter terminals of transistors $T_1$ and $T_2$ are connected to ground through respective resistors 32 and 34 and the emitter terminals of transistors $T_3$ and $T_4$ are grounded. Resistors 22 and 24 are preferably equal and may be each of the order of 100 ohms. Resistors 28 and 30 may each be about 50 ohms and resistors 32 and 34 may each be about 15 ohms. The coil 26 may have a resistance of 6 ohms and an inductance of 3 henries.

In operation, when the collector current of one rate setting transistor $T_1$, increases, the potential at the collector terminal of that transistor becomes less negative due to the increased potential drop across resistor 28. Accordingly the potential at the base of transmitter $T_2$ likewise becomes less negative due to the interconnection through resistor 22. The smaller potential difference between the emitter and base terminal of transistor $T_2$ reduces the current through that transistor and therefore makes the potential at the collector terminal of transistor $T_2$ more negative because of the smaller potential drop across resistor 30. Due to the connection through resistor 24 the increase in negative potential at the base of transistor $T_1$ further increases the conduction through transistor $T_1$ until transistors $T_1$ and $T_3$ are saturated, lamp $L_3$ is lighted, transistors $T_2$ and $T_4$ are blocked and lamp $L_4$ is extinguished. The reverse cycle is then initiated by the stored energy in the inductor 26 which, when the current through transistor $T_1$ reaches peak value, causes the base of transistor $T_2$ to become more negative thereby starting conduction through transistor $T_2$ and, with the concomitant increase in current through that transistor, causing reduction and finally cut off of current through transistor $T_1$. The rate of flashing with the above suggested values for the circuit constants of FIG. 2 will be about the same as that of FIG. 1, namely one per second.

The circuit of FIG. 2 is more suitable than that of FIG. 1 when extreme low temperatures are to be encountered. The circuit of FIG. 1 is preferable, however, when operation over a wide temperature range is not required as it does not require the use of the relatively heavy and expensive induction coil.

FIG. 3 is a circuit drawing of another system suitable for use over a wide temperature range. The circuit is an extension of the circuit of FIG. 1 in that a series of additional transistors of progressively increasing power are used between the multivibrator portion of the system and the lamp load to be flashed. This arrangement permits employment of high impedances, low power transistors and small condensers in the multivibrator portion of the system.

The rate setting transistors $T_5$ and $T_6$ of the circuit of FIG. 3 are low power transistors, such as 2N65a. Transistor $T_5$ has its emitter terminal grounded, its collector terminal connected to the negative terminal of the battery 2 through a resistor 36 and to the base terminal of transistor $T_6$ through a capacitor 38 of about 0.5 microfarad. Similarly transistor $T_6$ has its collector terminal connected to the negative terminal of the battery 2 through a resistor 40 and to the base terminal of transistor $T_5$ through a 0.5 microfarad capacitor 42. Resistors 36 and 40 may each be about 150 K. The base terminal of transistor $T_5$ is connected through a resistor 44 of about 2 megohms and a resistor 46 of about 1000 ohms to the negative terminal of the battery 2 and the base terminal of transistor $T_6$ is similarly connected to the negative terminal of battery 2 through a resistor 48 of about 2 megohms and the resistor 46.

The emitter terminal of transistor $T_6$ is connected to ground through a resistor 50 and is connected to the base terminal of a transistor $T_7$ of higher power than the transistors $T_5$ and $T_6$. Transistor $T_7$ may be, for example, a 2N382. The collector terminal of transistor $T_7$ is connected to the negative terminal of battery 2 through a load resistor 52 of about 3300 ohms. The emitter terminal of transistor $T_7$ is connected to ground through a resistor 54. Resistors 50 and 54 are each about 22 K. The emitter terminal of transistor $T_7$ is also connected to the base terminal of a transistor $T_8$ of still greater power. Transistor $T_8$ may be, for example, a 2N379. The collector terminal of transistor $T_8$ is connected to the negative terminal of battery 2 through a load resistor 56 of low ohmage, for example 75 ohms. The emitter terminal of transistor $T_8$ is connected to ground through a low resistor 58 of about 50 ohms and is also connected to the base terminal of the power output transistor $T_9$ which may be, for example, a 2N174. The lamp L to be flashed is a five ampere load and is connected between the negative terminal of the battery 2 and the collector terminal of transistor $T_9$. The emitter terminal of transistor $T_9$ is grounded.

With the above described circuit in which the impedances of the multivibrator are high and the rate setting transistors thereof are of low power and with the load resistors of the successively higher powered transistors being of successively less impedance small paper condensers the capacity of which does not change appreciably throughout a wide range of temperature, for example from −65° C. to +75° C., may be used in the multivibrator circuit and yet sufficient power is available through the cascading transistor circuit to energize the lamp load. Thus, by the provision of the additional transistors and their associated circuits, the vulnerability of the circuit of FIG. 1 to low temperatures is removed without requiring the use of the relatively heavy and expensive inductance coil of the circuit of FIG. 2. Although the circuit of FIG. 3 has been illustrated as arranged for flashing a single lamp load obviously a similar array of transistors could be coupled through the emitter circuit of transistor $T_5$ to provide a system for flashing two lamp loads.

The operation of the circuit of FIG. 3 will be clear from the description already given in connection with the operation of FIG. 1. When transistor $T_6$ is cut off transistors $T_7$ and $T_8$ and $T_9$ will be successively cut off and accordingly lamp L will be extinguished. When transistor $T_5$ is cut off transistors $T_6$, $T_7$, $T_8$, and $T_9$ will conduct and lamp L will be lighted.

The circuit of FIG. 4 while generally imilar to that of FIG. 1 differs from that circuit in two important respects. The circuit includes, in the base circuits of the rate setting transistors, temperature compensating elements, specifically thermistors, which insure constant flashing rate over the designated temperature range, namely, from −55° C. to +65° C., even when electrolytic condensers are employed. A thermistor is a semiconductor which has a high negative temperature coefficient of resistance. A full wave rectifier and filter are provided in the input circuit to permit operation of the flasher with supply sources of either alternating or direct current, the circuit being so designed that the filter does not reduce the current through the lamp load. A further and relatively minor departure in the circuit of FIG. 4 from that of FIG. 1 comprises the omission of a dropping resistor between the base circuits of the rate setting transistors and the negative input lead to the vibrator circuit.

Each of transistors $T_{10}$ and $T_{11}$ of the rate setting circuit of FIG. 4 may be a medium powered transistor, for example a 2N379. The collector terminal of transistor $T_{10}$ is connected through a dropping resistor 60 of say 150 ohms to a line 62 of negative potential and the collector terminal of transistor $T_{11}$ is connected through a dropping resistor 64 of like magnitude to the line 62. The base terminal of transistor $T_{10}$ is coupled to the collector terminal of transistor $T_{11}$ through a capacitor 66 and similarly the base terminal of transistor $T_{11}$ is coupled to the collector terminal of transistor $T_{10}$ through a capacitor 68. The base terminal of transistor $T_{10}$ is connected through a resistor 70 to the line 62 and similarly the base terminal of transistor $T_{11}$ is connected to the line 62 through a resistor 72. Connected across resistor 70 is a series circuit comprising a resistor 74 and a thermistor 76 and connected across resistor 72 is a similar series circuit comprising a resistor 78 and a thermistor 80. Resistors 70 and 72 may each be, for example, 2700 ohms and resistors 74 and 78 may each be 5100 ohms. Thermistors 76 and 80 may each have a nominal resistance of 300 ohms at 25° C. Capacitors 66 and 68 may each be 100 microfarad electrolytic condensers but preferably, to provide in the specific circuit of FIG. 4, an unequal "on" and "off" period for the lamps these capacities are unequal, the capacity of capacitor 68 being 100 microfarads and that of capacitor 66 250 microfarads.

The emitter terminal of transistor $T_{10}$ is connected to a positive potential line 82 and the emitter terminal of transistor $T_{11}$ is connected through a resistor 84 of say 15 ohms to the line 82. The emitter terminal of transistor $T_{11}$ is also connected to the base terminal of a power transistor $T_{12}$ in the collector circuit of which is the lamp load 86 to be flashed, the load being shown specifically as a bank of three lamps connected in parallel. The transistor $T_{12}$ may be, for example a 2N174. The emitter terminal of transistor $T_{12}$ is connected directly to the line 82. Lines 62 and 82 are connected through a filter comprising series resistors 88 and 90 and parallel connected capacitors 92, 94 and 96, to output terminals of a full wave crystal rectifier 98 the input terminals of which are connected to supply terminals 100 across which a supply voltage of from 24 to 30 volts of either A.C. or D.C. may be impressed. A line 102 connects the negative output terminal of the rectifier 98 to the lamp load 86 thereby bypassing the filter from the lamp circuit.

Resistors 88 and 90 of the filter circuit may each be about 10 ohms and capacitors 92, 94 and 96 may each be of 250 microfarad capacitance.

The operation of the circuit of FIG. 4 will be clear from the description previously given of the operation of the circuit of FIG. 1. With the specific values suggested for the various elements of the circuit the flashing rate will be about one per second. When capacitor 66 is a 250 $\mu$fd. condenser and capacitor 68 a 100 $\mu$fd. condenser, the lamps will have an "on" period of 70% and an "off" period of 30%. At low temperatures, the flashing rate will not vary as the reduction in capacitance of the condensers 66 and 68 will be compensated for by the increase in resistance in the base circuits of transistors $T_{10}$ and $T_{11}$ occasioned by the increase in resistance of each of the thermistors 76 and 80.

When an alternating voltage is impressed across terminals 100, the lamps and transistor $T_{12}$ operate at full voltage with a fairly large ripple which does not affect their operation. The rate setting portion of the circuit including the transistors $T_{10}$ and $T_{11}$ operates on direct current with practically no ripple because of the provision of the filter in the input circuit. Without the filter, flickering of the lamps, rather than proper flashing, is apt to occur. As the lamp current is not filtered, the lamps operate at full brilliance. When a direct voltage is impressed across terminals 100, the operation is the same, except, of course, there will be no ripple in the current through transistor $T_{12}$ and through the lamps.

The invention has now been described with reference to four embodiments thereof. Specific circuit constants have been suggested but obviously these may be varied without departing from the invention. In the circuit of FIG. 1 and in that of FIG. 3 when extended to flash two lamp loads the lamps will have equal "on" periods when the capacities of the capacitors are equal and the resistors in the rate setting transistor base circuits are of equal magnitude. In the circuit of FIG. 2 the lamps will have equal "on" periods when the cross connecting resistors are of equal magnitude and the center of inductor 26 is grounded. If unequal periods of illumination of the lamps is desired obviously the circuits could be so designed by providing unequal capacitors and/or resistors of unequal magnitude in the rate setting transistor base circuits of FIGS. 1 and 3 or in the cross-connecting circuits of FIG. 2. Temperature compensation, by the use of thermistors, in the base circuits of the rate setting transistors could be provided in the circuits of FIGS. 1 and 3, as in the specific circuit of FIG. 4. If it is desired to operate the circuits of FIGS. 1, 2 or 3 from a source of alternating voltage, a full wave rectifier and filter connected as in the circuit of FIG. 4, could be provided.

This application is a continuation-in-part of my copending application Serial No. 695,129, filed November 7, 1957, now abandoned, for "Transistor Circuit for Intermittently Energizing a Load."

The following is claimed:

1. A circuit for intermittently energizing a load, comprising a pair of rate setting transistors each having an emitter, a collector and a base terminal, a source of direct current energy, a dropping resistor connected between one terminal of said source and the collector terminal of one of said transistors, a dropping resistor connected between said one terminal of the source and the collector terminal of the other of said two transistors, impedances connecting the base terminal of each of said transistors with the collector terminal of the other transistor, means separately connecting the emitter of each of said transistors with the other terminal of said source, connections including an impedance between the base terminals of said transistors, and at least one power transistor having a base terminal coupled to the emitter terminal of one of said pair of transistors, a collector terminal connected through the load to said first mentioned terminal of said source and an emitter terminal connected to the other terminal of said source.

2. The circuit according to claim 1 wherein said impedances connecting the base terminal of each of said pair of transistors with the collector terminal of the other one of the pair of transistors are capacitors and said impedance in the connections between the base terminals of said pair of transistors include resistive elements having relatively large negative temperature coefficients of resistance, said elements compensating for decrease in capacity of said capacitors at low temperature to maintain constant rate of oscillation of the circuit over a wide temperature range.

3. The circuit according to claim 2 wherein said impedance including resistive elements comprises a pair of resistors of equal resistance each connected at one end to a base terminal of a rate setting transistor and at its other end to said one terminal of said source and a pair of like series circuits each including a resistor and a thermistor, one of said series circuits being connected in parallel with one of said pair of resistors and the other of said series circuits being connected in parallel with the other of said pair of resistors, the total resistance of said series circuits being larger than that of said pair of resistors, said thermistors comprising said elements having relatively large negative temperature coefficients of resistance.

4. The circuit according to claim 1 wherein said source includes a full wave rectifier having a pair of output terminals, and wherein a filter is connected across said output terminals, the load being connected directly to one of said output terminals and said dropping resistors being connected to said one output terminal through elements of said filter.

5. The circuit according to claim 1 including a second power transistor having a base terminal coupled to the emitter terminal of the other of said pair of transistors, a collector terminal connected through another load to said first mentioned terminal of said source and an emitter terminal connected to the other terminal of said source.

6. The circuit according to claim 1 wherein the coupling between said one power transistor and the emitter terminal of said one of said pair of transistors includes at least one other transistor of power intermediate that of either of said pair of transistors and said power transistor, the collector terminal of said transistor of intermediate power being connected through a dropping resistor to said first terminal of said source, the emitter terminal thereof being connected to the base terminal of the power transistor and through an impedance to the other terminal of said source and the base terminal thereof being coupled to the emitter terminal of said one of said pair of transistors, said last mentioned dropping resistor being of an impedance less than that of either of said first mentioned dropping resistors and greater than that of the load.

7. The circuit according to claim 1 wherein said source includes a full wave rectifier having a pair of output terminals and wherein a filter is connected across said output terminals, said load being a lamp load directly connected to one of said output terminals and said dropping resistors being connected to said one output terminal through elements of said filter.

8. The circuit according to claim 7 wherein said impedances interconnecting the collector terminal of each rate setting transistor with the base terminal of the other rate setting transistor include electrolytic condensers and wherein the impedance interconnecting the base terminals of said rate setting transistors is a resistive impedance connected at substantially a mid point to the other one of said output terminals, said resistive impedance including thermistors to compensate for change in capacity of said condensers at low temperature and thereby maintain constant the rate of flashing of the lamp load over a wide temperature range.

9. The circuit according to claim 8 wherein said condensers are of unequal capacitance to provide different on and off periods of the lamp load.

10. A circuit for intermittently energizing a lamp load comprising a high impedance transistor multivibrator including a pair of rate setting low power transistors each having collector, emitter and base terminals, a source of direct current energy for said multivibrator, a plurality of additional transistors each having collector, emitter and base terminals, said transistors being of different power and the power of each being greater than that of either of said rate setting transistors, the collector terminals of said additional transistors each being connected to one terminal of said source through a separate impedance, the lamp load comprising the impedance through which the collector terminal of the transistor of highest power is connected to said one terminal of the source, the emitter terminals of said additional transistors each being connected to the other terminal of said source and the base terminal of the said additional transistors each being connected to the emitter terminal of the next lower powered transistor with the base terminal of the lowest powered of the additional transistors being connected to the emitter terminal of one of said rate setting transistors.

References Cited in the file of this patent

UNITED STATES PATENTS

| | | |
|---|---|---|
| 2,776,382 | Jensen | Jan. 1, 1957 |
| 2,776,420 | Woll | Jan. 1, 1957 |
| 2,780,752 | Aldrich | Feb. 5, 1957 |
| 2,829,257 | Root | Apr. 1, 1958 |
| 2,850,630 | Prugh | Sept. 2, 1958 |
| 2,916,670 | Pederson | Dec. 8, 1959 |